(12) United States Patent
Roth

(10) Patent No.: US 10,309,865 B2
(45) Date of Patent: Jun. 4, 2019

(54) INTEGRATED BUILDING MONITORING SYSTEM

(71) Applicant: Jason Todd Roth, Orlando, FL (US)

(72) Inventor: Jason Todd Roth, Orlando, FL (US)

( * ) Notice: Subject to any disclaimer, the term of this patent is extended or adjusted under 35 U.S.C. 154(b) by 0 days.

(21) Appl. No.: 15/983,754

(22) Filed: May 18, 2018

(65) Prior Publication Data
US 2018/0340857 A1 Nov. 29, 2018

Related U.S. Application Data

(60) Provisional application No. 62/511,582, filed on May 26, 2017.

(51) Int. Cl.
G01M 3/00 (2006.01)
G01M 3/40 (2006.01)
G08B 21/20 (2006.01)

(52) U.S. Cl.
CPC .............. G01M 3/40 (2013.01); G01M 3/002 (2013.01); G08B 21/20 (2013.01)

(58) Field of Classification Search
None
See application file for complete search history.

(56) References Cited

U.S. PATENT DOCUMENTS

| | | | |
|---|---|---|---|
| 3,689,929 A | 9/1972 | Moody | |
| 4,502,044 A | 2/1985 | Faris et al. | |
| 4,837,499 A * | 6/1989 | Scherer | A01G 25/167 324/696 |
| 4,942,364 A * | 7/1990 | Nishijima | G01N 27/121 324/694 |
| 4,952,868 A * | 8/1990 | Scherer | A01G 25/167 137/78.3 |
| 5,081,422 A | 1/1992 | Shih | |
| 5,291,181 A | 3/1994 | Deponte | |
| 5,682,788 A * | 11/1997 | Netzer | B32B 17/10036 318/444 |
| 5,748,092 A * | 5/1998 | Arsenault | G01M 3/18 340/602 |
| 5,801,307 A * | 9/1998 | Netzer | B32B 17/10036 73/170.17 |
| 7,676,194 B2 | 3/2010 | Rappaport | |
| 8,384,886 B2 | 2/2013 | Richardson et al. | |
| 2004/0125024 A1 | 7/2004 | Kim et al. | |
| 2006/0144437 A1* | 7/2006 | Dresselhaus | A01G 25/167 137/78.3 |

(Continued)

Primary Examiner — Fekadeselassie Girma
(74) Attorney, Agent, or Firm — Matthew G. McKinney, Esq.; Allen, Dyer, Doppelt + Gilchrist, PA

(57) ABSTRACT

An integrated building monitoring system including a conductive grid having a plurality of rows, where each row has a plurality of interwoven positive and negative electrodes forming a hexagon pattern, and the conductive grid is integrated within a wall. The system also includes a plurality of signal nodes, where a signal node is coupled to a respective row and each of the rows is insulated from one another. A controller is coupled to the plurality of signal nodes and has a current sensing circuit. In addition, the current sensing circuit is configured to measure the current for each of the rows of the conductive grid to sense when an electrical signal from a row of the conductive grid indicates that moisture is present within the wall when a voltage is applied.

16 Claims, 4 Drawing Sheets

(56) References Cited

U.S. PATENT DOCUMENTS

| | | | |
|---|---|---|---|
| 2006/0144438 A1* | 7/2006 | Dresselhaus | G01N 27/223 137/78.3 |
| 2008/0041792 A1* | 2/2008 | Crnkovich | A61F 13/42 210/739 |
| 2008/0204260 A1* | 8/2008 | Rienecker | B60S 1/0822 340/604 |
| 2008/0211521 A1* | 9/2008 | Lock | G01N 33/246 324/696 |
| 2009/0107220 A1* | 4/2009 | Chen | G01N 27/223 73/73 |
| 2011/0109328 A1* | 5/2011 | Gulbranson | G01N 27/221 324/664 |
| 2014/0046611 A1* | 2/2014 | Bloemendaal | G01N 27/223 702/65 |
| 2015/0075255 A1* | 3/2015 | Yabe | G01N 27/048 73/29.05 |
| 2017/0011612 A1* | 1/2017 | Jain | G08B 21/182 |
| 2017/0030861 A1* | 2/2017 | Jiao | B64D 45/00 |
| 2017/0108529 A1* | 4/2017 | Zhang | G01P 15/18 |
| 2017/0354374 A1* | 12/2017 | Pepin | A61B 5/0002 |
| 2018/0153430 A1* | 6/2018 | Ang | A61B 5/04001 |

* cited by examiner

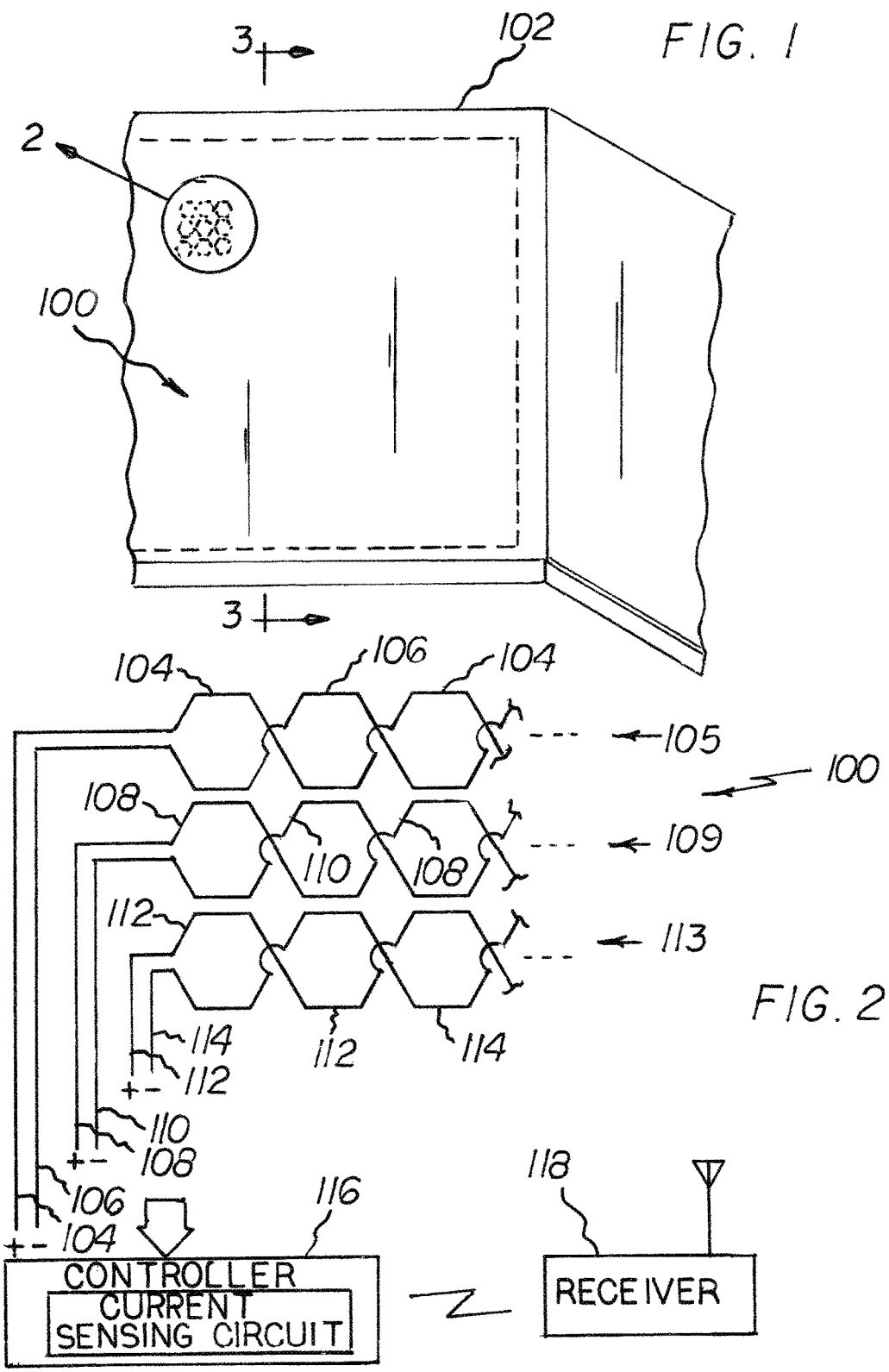

INTEGRATED BUILDING MONITORING SYSTEM

RELATED APPLICATION

The present invention is related to U.S. Provisional Patent Application Ser. No. 62/511,582 filed May 26, 2017, the entire contents of which are incorporated herein by reference.

TECHNICAL FIELD

The present invention relates to the field of monitoring systems, and, more particularly, to an integrated building monitoring system and related methods.

BACKGROUND

Buildings and homes are susceptible to water leaks and other environmental conditions that can damage property and be harmful to people. For example, water leaks are common through a roof, around a window, walls, and a floor. The leaks can occur for myriad of reasons such as deteriorating building materials, improper installation, lack of maintenance, or through cracks in the walls or floors. The construction defects may not be visible until after a problem manifests itself as a result of the defect. It is advantageous to detect problem areas early since the presence of water within the building envelop results in deterioration and may lead to accumulation of moisture and mold which are hazardous. Even when the problem area is discovered, it may still be difficult to identify the location of the source of the moisture intrusion and construction defect. For example, it may be required to remove a large area of the wall in order to identify the location of the problem area and the construction defect. Accordingly, there is a need to develop a system to monitor buildings to detect an accurate location of a problem area and before the problem area damages the property or creates a health hazard.

SUMMARY

An integrated building monitoring system is disclosed. The system includes a conductive grid having a plurality of rows, where each row has a plurality of interwoven positive and negative electrodes forming a hexagon pattern, and the conductive grid is configured to be integrated within a wall. The system also includes a plurality of signal nodes, where a signal node is coupled to a respective row and each of the rows is insulated from one another. A controller is coupled to the plurality of signal nodes and has a current sensing circuit. In addition, the current sensing circuit is configured to measure the current for each of the rows of the conductive grid to sense when an electrical signal from a row of the conductive grid indicates that moisture and/or a mold colony is present within the wall when a voltage is applied.

BRIEF DESCRIPTION OF THE DRAWINGS

FIG. 1 is an elevational view of an integrated building monitoring system in accordance with an embodiment of the invention;

FIG. 2 is a detailed view of a portion of a conductive grid of the integrated building monitoring system shown in FIG. 1;

DETAILED DESCRIPTION

Figure 3:
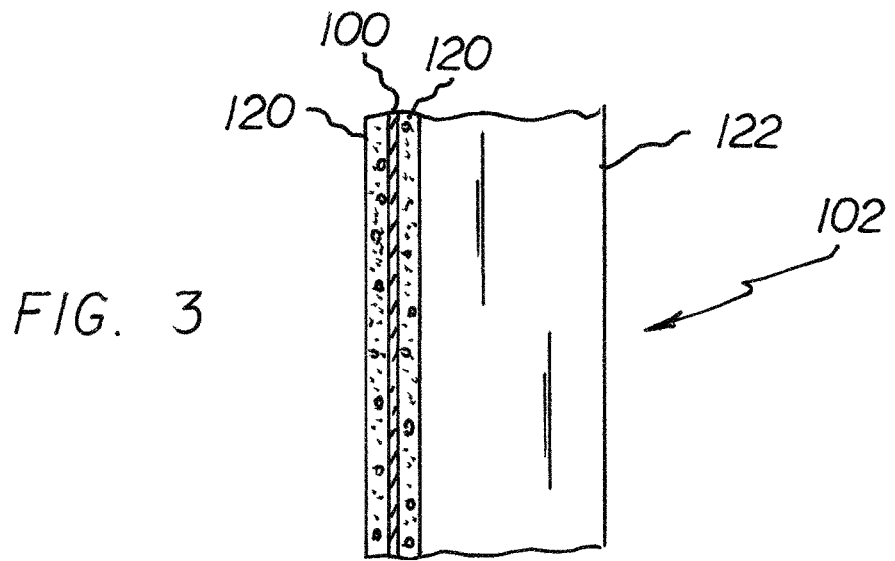
FIG. 3 is a cross sectional view of the conductive grid integrated within the wall panel.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The integrated building monitoring system is configured to detect a problem within a wall. This is accomplished by sensing an electrical signal within the system as described below. In particular, the system detects moisture that has intruded and soaked into a wall panel, which is proven to be the cause of wall breakdown and is the main breeding ground that allows mold growth.

Referring now to FIG. 1, a conductive grid 100 is integrated within a wall panel 120 such as sheetrock, for example. In a particular illustrative embodiment, the conductive grid 100 is integrated within the wall panel 120 that is secured to the wall studs 122. The conductive grid 100 could also be integrated within concrete board, plastic board, bricks, masonry and most building materials that are used to create solid surfaces for walls, ceilings or floors, and is not limited to the sheetrock example described herein.

The conductive grid 100 includes a plurality of interwoven electrodes as shown in FIG. 2. In a particular illustrative embodiment, a first positive electrode 104 forms a hexagon pattern with a first negative electrode 106 along a first row 105. Similarly, a second positive electrode 108 forms a hexagon pattern with a second negative electrode 110 along a second row 109. A third positive electrode 112 forms a hexagon pattern with a third negative electrode 114 along a third row 113. The conductive grid 100 is formed by a plurality of these rows of interwoven positive and negative electrodes as described above and shown in FIG. 2. Each of the rows 105, 109, 113 have a separate signal node and are otherwise insulated from each other.

In addition, each of the rows 105, 109, 113, of the conductive grid 100 are coupled to a controller 116. The controller 116 is configured to sense when an electrical signal from a row of the conductive grid indicates that a mold colony or moisture is present within the wall panel 120. The controller is configured to identify the row where the electrical signal originated in order to locate the problem area in the wall panel 120.

The conductive grid 100 may be mounted to a dielectric substrate 124 and use insulated spacers 126 to keep a distance between each of the positive and negative electrodes when crossing to form the hexagon shape. Also, the conductive grid 100 may comprise patterns other than a hexagon.

The controller 116 is coupled to an electrical power source and may include a current sensing circuit. The electrical power source may include a dc voltage supply or other power source such as solar panels, etc. The current sensing circuit measures the current for each of the rows of the conductive circuit 100. When the wall panel 120 is in good shape, the resistance between the positive and negative electrodes will be very high and there will be no current when a voltage is applied. When there is a mold colony or moisture within an area of the conductive grid 100, the resistance between the positive and negative electrodes will be low and an electrical current will flow therebetween when a voltage is applied. This current is measured by the current sensing circuit which can generate an alarm signal that is transmitted by the controller 116 to a remote receiver 118 to provide an alarm. The controller 116 may also be configured to transmit the alarm signal to smart phones, tablets, computers and also make predictive trending analysis alarms.

The detection of the location of the mold colony or moisture within the wall panel 120 is achieved by measuring separately the current within each of the rows 105, 109, 113 formed by the respective positive and negative electrodes.

The conductive grid 100 can also be configured for thermal sensing. Thermal sensing can be used to determine temperature differences that may be indicative of problem areas, such as walls that regularly get wet from sprinklers. The thermal sensing may also detect an abnormality in the continuity of the temperature allowing the user to indicate a problem spot where water should not be collecting. Also, the temperature of a wall surface is important near electrical outlets that may be having unknown or hidden electrical issues (usually heat signatures are present before an electrical line pops, snaps, turns into fire or causes a blown circuit). Also, elevated surface temperatures near a dryer vent duct, may suggest heat issues from clogged vents (main cause for home fires) as opposed to ambient room temperature or smoke being the only indicator of an issue.

Referring now to FIG. 3, a typical wall section 102 is illustrated taken in the direction of line 3-3 of FIG. 1. The wall section 102 includes wall studs 122 that provide the framework for the wall 102. The conductive grid 100 is integrated with the sheetrock 120, is secured to the wall studs 122. In another aspect, the wall studs 122 may instead be a concrete block wall or other structure.

Figure 4:
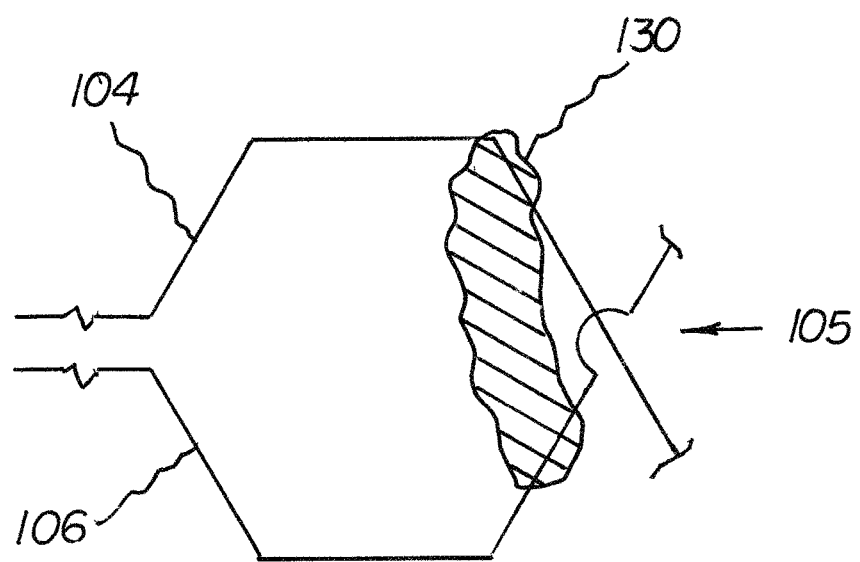
FIG. 4 is a detailed view of a mold colony detected by the conductive grid.

Referring now to FIG. 4, a detailed view of the conductive grid 100 is shown. As described above, the conductive grid 100 includes a positive electrode 104 and a negative electrode that cross at certain points to form the desired hexagon pattern along the row. The hexagon pattern of the positive and negative electrodes minimizes the number of rows of electrodes required to adequately cover a surface area. In particular, the crisscrossing of the positive and negative electrodes also increases the accuracy of locating a problem area. Wherever the respective electrodes are adjacent to each other along an adjacent row, the polarity of each of the electrodes is the opposite of the adjacent electrode.

As shown in FIG. 4, a mold colony 130 is located between the positive electrode 104 and the negative electrode 106 of the first row 105. Accordingly, when a voltage is applied to the first row 105, an electrical current will flow between the positive 104 and negative electrodes 106. This increase in current is measured by the current sensing circuit which will generate an alarm signal and indicate that there is a problem area within the first row 105.

Figure 5:
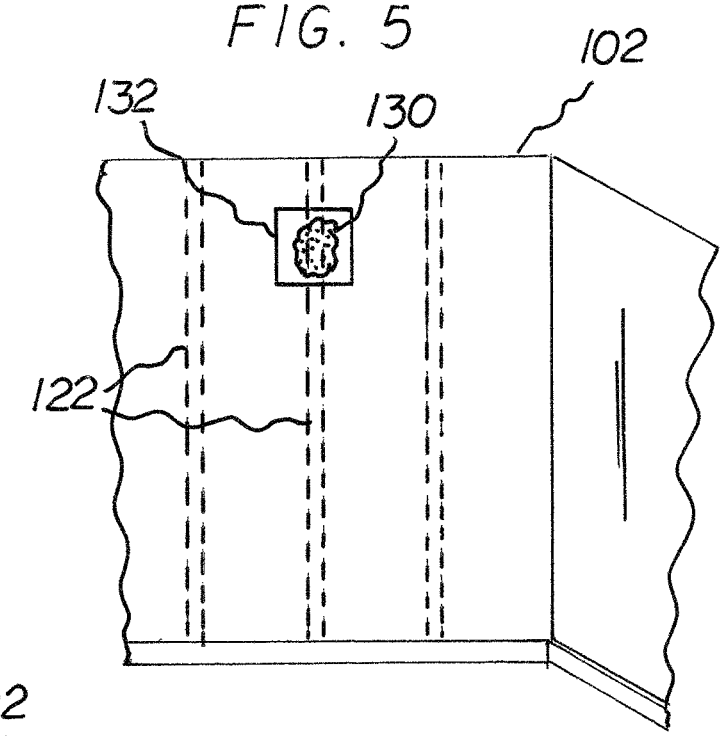
FIG. 5 is an elevational view of the mold colony within the wall and a damaged wall portion being removed.
Figure 6:
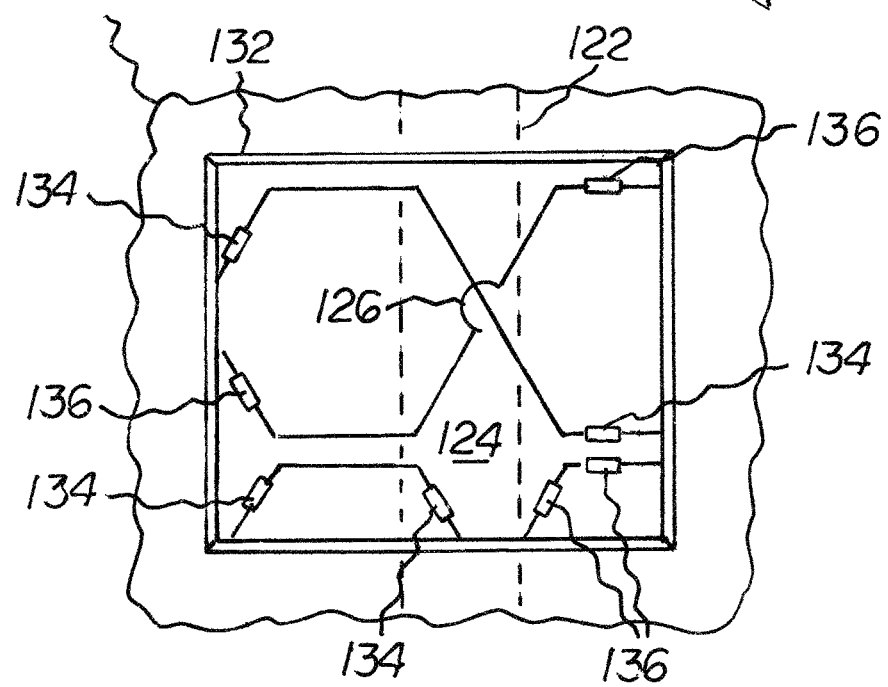
FIG. 6 is an elevational view of the damaged wall portion having a replacement section connected to the conductive grid after a repair.

Referring now to FIGS. 5 and 6, the problem area 132 is identified within the first row 105, so that the mold colony 130 can be removed from the wall 102. Typically, the sheetrock 120 around the problem area 132 is cut out to remove the mold colony 130. When the sheetrock 120 around the problem area 132 is cut out from the wall 102, the conductive grid 100 will be partially severed. Accordingly, wherever a positive or negative electrode has been severed, a piece of sheetrock 124 having a replacement grid is secured in the removed portion in the wall to fill it in to complete the repair. The positive and negative electrodes of the replacement grid are connected to the conductive grid 100 using positive connectors 134 and negative connectors 136 in order to restore the functionality of the rows that were impacted by the removal of the problem area 132.

Figure 7:
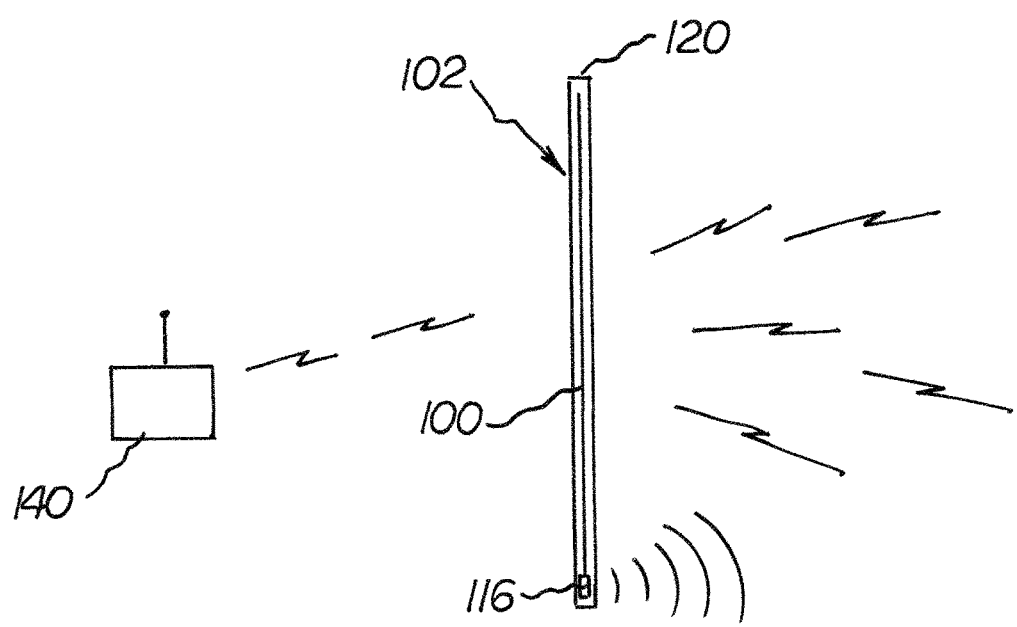
FIG. 7 is a schematic illustrating the conductive grid within the wall panel functioning as an antenna and signal repeater.
Figure 8:
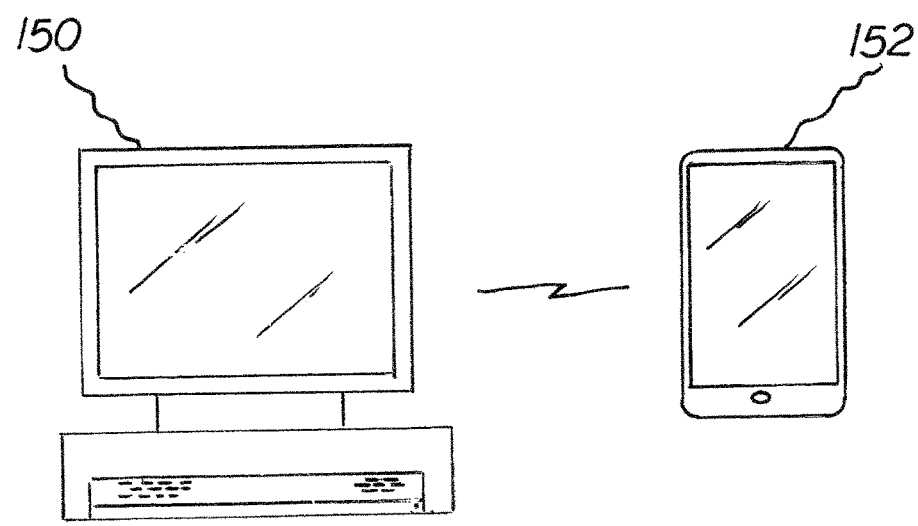
FIG. 8 is a personal computer having a user interface for use with the system and in communication with a cellular device.

Referring now to FIG. 7, the conductive grid 100 can also be configured to operate as an antenna and transmitter. In particular, a first portion of the conductive grid 100 within the wall panel 120 is configured to receive wireless signals and amplify the signals in a particular embodiment. A second portion of the conductive grid is configured to transmit the amplified wireless signals. For example, a wireless router 140 may transmit wireless signals on one side of the wall 102, which are received by the conductive grid 100. The controller 116, which is coupled to the conductive grid 100, may take the signals and re-transmit on the other side of the wall 102. Accordingly, the performance of the transmission of wireless signals throughout a building may be improved to a wireless access point such a personal computer 150 or a cellular device 152 or other personal electronic device as shown in FIG. 8.

The system may also be configured to tie into the low voltage wiring in the home in order to provide energy to low voltage items in a home or business without running separate electrical lines (this would involve completing the original circuit to continue the moisture sensing).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An integrated building monitoring system, the system comprising:
    a conductive grid having a plurality of rows, wherein each row having a plurality of interwoven electrodes forming a pattern;
    a plurality of signal nodes, where a signal node is coupled to a respective row and each of the rows is insulated from one another;
    a controller coupled to the plurality of signal nodes and having a current sensing circuit, wherein the current sensing circuit is configured to measure the current for each of the rows of the conductive grid to sense when an electrical current from a row of the conductive grid indicates that moisture is present when a voltage is applied, to transmit an alarm signal to the controller when the electrical current is detected, and to generate predictive trending analysis alarms; and
    a remote receiver configured to receive the alarm signal and generate an alarm.

2. The integrated building monitoring system of claim 1, further comprising a planar wall panel having the conductive grid formed therein.

3. The integrated building monitoring system of claim 1, wherein the electrodes have different electrical potentials.

4. The integrated building monitoring system of claim 1, wherein the pattern of the plurality of interwoven electrodes forms a hexagon shape.

5. The integrated building monitoring system of claim 1, further comprising a dielectric substrate mounted to the conductive grid; and insulated spacers between each of the electrodes that cross each other.

6. The integrated building monitoring system of claim 1, wherein the controller is configured to transmit the alarm signal to an electronic wireless device.

7. The integrated building monitoring system of claim 1, wherein the current sensing circuit is configured to determine a location of moisture by measuring separately the current within each of the rows formed by the respective electrodes.

8. The integrated building monitoring system of claim 1, further comprising a thermal sensor coupled to a respective electrode of the plurality of interwoven electrodes.

9. The integrated building monitoring system of claim 1, wherein the conductive grid is configured to operate as an antenna and transmitter.

10. The integrated building monitoring system of claim 1, wherein the controller is configured to receive wireless signals via the conductive grid on a first side of the wall panel, and re-transmit the wireless signals from a second side of the wall panel.

11. The integrated building monitoring system of claim 1, wherein the conductive grid is configured to couple to a low voltage wiring network.

12. An integrated building monitoring system, the system comprising:

a wall panel having a first side and a second side, and having a conductive grid of a plurality of rows formed therein, wherein each row having a plurality of interwoven electrodes forming a pattern;

a plurality of signal nodes, where a signal node is coupled to a respective row and each of the rows is insulated from one another;

a controller coupled to the plurality of signal nodes and having a current sensing circuit, wherein the controller is configured to receive wireless signals via the conductive grid on a first side of the wall panel, and re-transmit the wireless signals from a second side of the wall panel; and wherein the current sensing circuit is configured to measure the current for each of the rows of the conductive grid to sense when an electrical current from a row of the conductive grid indicates that moisture is present when a voltage is applied.

13. The integrated building monitoring system of claim 12, wherein the conductive grid is configured to couple to a low voltage wiring network.

14. The integrated building monitoring system of claim 12, wherein the electrodes have different electrical potentials.

15. The integrated building monitoring system of claim 12, wherein the pattern of the plurality of interwoven electrodes forms a hexagon shape.

16. The integrated building monitoring system of claim 12, further comprising a dielectric substrate mounted to the conductive grid; and insulated spacers between each of the electrodes that cross each other.

* * * * *